United States Patent
Rosenberg et al.

(10) Patent No.: US 6,195,618 B1
(45) Date of Patent: Feb. 27, 2001

(54) COMPONENT POSITION VERIFICATION USING A PROBE APPARATUS

(75) Inventors: Louis B. Rosenberg; James R. Riegel, both of San Jose, CA (US)

(73) Assignee: MicroScribe, LLC, San Jose, CA (US)

( * ) Notice: Subject to any disclaimer, the term of this patent is extended or adjusted under 35 U.S.C. 154(b) by 0 days.

(21) Appl. No.: 09/173,223

(22) Filed: Oct. 15, 1998

(51) Int. Cl.$^7$ .................................................. G01B 7/008

(52) U.S. Cl. ............................. 702/152; 702/81; 700/66; 700/109

(58) Field of Search .................................... 702/150–153, 702/155, 158, 33, 35, 36, 81–84, 94, 95, 127, 128, 163, 166–168, 183, FOR 146, FOR 147, FOR 170, FOR 171, FOR 123, FOR 125, FOR 137, FOR 141, FOR 144, FOR 145; 700/58, 65, 66, 109, 110, 114–116, 117, 121, 124, 125, 186, 192–195, 245, 257, 258, 264, 302, 303; 382/145–147, 149–152; 324/537, 754, 764, 756–758; 33/1 MP, 1 PT, 559, 503–505, 553; 73/865.8, 866.5; 345/156, 157, 158, 162, 178, 179; 901/44, 45, 46, 33, 15, 10.6; 438/14–16, 7, 10, 12, 107, 129, FOR 142; 228/8–12; 29/799, 791, 740, 741, 742, 720, 709–713; 414/935–938

(56) References Cited

U.S. PATENT DOCUMENTS

| | | | |
|---|---|---|---|
| 3,531,868 | 10/1970 | Stevenson | 33/174 |
| 3,944,798 | 3/1976 | Eaton | 235/151.3 |
| 4,593,470 | 6/1986 | Davies | 33/1 CC |
| 4,598,459 | * 7/1986 | Klink et al. | 700/114 |
| 4,653,011 | 3/1987 | Iwano | 364/513 |
| 4,679,331 | 7/1987 | Koontz | 33/551 |
| 4,703,443 | 10/1987 | Moriyasu | 364/559 |
| 4,750,487 | 6/1988 | Zanetti | 128/303 B |
| 4,769,763 | 9/1988 | Trieb et al. | 364/559 |
| 4,807,152 | 2/1989 | Lane et al. | 364/513 |
| 4,819,195 | 4/1989 | Bell et al. | 364/571.05 |
| 4,857,816 | 8/1989 | Rogozinski et al. | 318/632 |
| 4,891,889 | 1/1990 | Tomelleri | 33/503 |
| 4,961,267 | 10/1990 | Herzog | 33/503 |
| 4,982,504 | 1/1991 | Söderberg et al. | 33/502 |
| 5,040,306 | 8/1991 | McMurtry et al. | 33/556 |
| 5,050,608 | 9/1991 | Watanabe et al. | 128/653 R |
| 5,088,046 | 2/1992 | McMurtry | 364/474.03 |
| 5,088,055 | 2/1992 | Oyama | 364/560 |
| 5,126,948 | 6/1992 | Mitchell et al. | 364/474.03 |
| 5,131,844 | 7/1992 | Marinaccio et al. | 433/72 |
| 5,134,782 | 8/1992 | Breyer et al. | 33/503 |
| 5,148,377 | 9/1992 | McDonald | 364/560 |
| 5,168,453 | * 12/1992 | Nomaru et al. | 901/46 |
| 5,184,306 | 2/1993 | Erdman et al. | 364/474.05 |

(List continued on next page.)

FOREIGN PATENT DOCUMENTS

| | | |
|---|---|---|
| 0541500A1 | 5/1993 | (EP) . |
| 0640902A2 | 3/1995 | (EP) . |

Primary Examiner—Hal Wachsman
(74) Attorney, Agent, or Firm—James R. Riegel

(57) ABSTRACT

Method and system for checking and verifying the positions of components on an object such as a circuit board using a probe apparatus. A component of the object, positioned at a particular location on the object, is selected by the user using the probe apparatus. Reference information about a correct component positioned at the location of the selected component is displayed or otherwise provided, and the displayed reference information is compared with the selected component to determine if the selected component is of the correct type and value. Preferably, the selecting is accomplished by moving a probe tip of the probe apparatus within a predetermined distance of the selected component and activating a control, such as a button. The user can initiate a verify signal or a failure signal depending on whether the selected component matches the reference information.

37 Claims, 4 Drawing Sheets

U.S. PATENT DOCUMENTS

| | | | |
|---|---|---|---|
| 5,187,874 | 2/1993 | Takahashi et al. | 33/502 |
| 5,189,806 | 3/1993 | McMurtry et al. | 3/503 |
| 5,208,763 | 5/1993 | Hong et al. | 364/551.02 |
| 5,209,131 | 5/1993 | Baxter | 73/865.8 |
| 5,230,623 | 7/1993 | Guthrie et al. | 433/72 |
| 5,246,316 | 9/1993 | Smith | 408/1 R |
| 5,251,127 | 10/1993 | Raab | 364/413.13 |
| 5,251,156 | 10/1993 | Heier et al. | 364/559 |
| 5,299,288 | 3/1994 | Glassman et al. | 395/80 |
| 5,343,391 | 8/1994 | Mushabac | 364/413.28 |
| 5,390,128 * | 2/1995 | Ryan et al. | 901/44 |
| 5,402,582 | 4/1995 | Raab | 33/503 |
| 5,412,880 | 5/1995 | Raab | 33/503 |
| 5,429,682 | 7/1995 | Harlow, Jr. et al. | 118/681 |
| 5,436,542 | 7/1995 | Petelin et al. | 318/567 |
| 5,465,323 | 11/1995 | Mallet | 395/123 |
| 5,467,289 | 11/1995 | Abe et al. | 364/560 |
| 5,510,977 * | 4/1996 | Raab | 700/66 |
| 5,526,576 | 6/1996 | Fuchs et al. | 33/503 |
| 5,611,147 | 3/1997 | Raab | 33/503 |
| 5,724,264 | 3/1998 | Rosenberg et al. | 364/559 |
| 5,794,356 | 8/1998 | Raab | 33/503 |
| 5,898,590 * | 4/1999 | Wampler et al. | 33/504 |

* cited by examiner

COMPONENT POSITION VERIFICATION USING A PROBE APPARATUS

BACKGROUND OF THE INVENTION

This invention relates generally to tracking the position of objects in three dimensional space, and more particularly to verifying the position of components of an object in 3-D space using a probe apparatus.

In many assembly processes of electronic devices, several different components must be assembled quickly and reliably to allow the devices to be offered to consumers at low prices. Circuit boards used in electronic devices are one of the most common multi-component parts that require such efficient assembly. Assembling printed circuit boards, often called "stuffing" the circuit board, typically involves placing components on a circuit board in predetermined locations and soldering the components in place. The components might include resistors, capacitors, integrated circuits, op amps, connectors, wire leads, clock crystals, inductors, or a variety of other passive and active components. Many different types of these components are often assembled on a single board and must be soldered in the correct location on the board for a board to function properly. The components can be placed and soldered by human assemblers but are more often "stuffed" by more automated methods. For example, a "pick and place" machine is a robotic device that automatically puts the various components in previously programmed positions. A "wave solderer" is a machine that solders many components on a circuit board in place at once. These types of tools greatly accelerate the circuit board assembly process.

Regardless of how a board is assembled, by hand or by machine, it is often important to perform quality control measures to ensure the board has the proper components in the proper locations. A board with even one component in the wrong place may function incorrectly or not at all. Errors in the assembly process can originate from a variety of sources. For example, a human assembler might have put a component in the wrong position on the circuit board. Or, a human operator might have loaded the wrong components in a pick and place machine. In many cases, different components appear very similarly and may vary only by their values or class. For example, resistors having different resistance values or capacitors having different capacitance values may appear almost identical, leading to these errors. Or, the pick and place machine may have been incorrectly programmed, leading to other errors. Regardless of why the errors occurred, the result is the same: an incorrectly placed component can result in a non-functional product. The more non-functional products resulting in an assembly process, the greater the cost of the functional products to the buyer.

Quality control procedures for circuit boards are rigorous processes in which every component on the circuit board is checked to ensure that the board has been properly assembled. Both the type of component and also the specific values of the components are checked. This is often accomplished by human operators who visually inspect the circuit boards. The process involves looking at a document, usually a "bill of materials" and/or a board schematic, and confirming visually that every component on the board is correctly placed and has the correct value. This process tends to be tedious because it involves looking back and forth from the board to the documents. What is needed is a rapid way to point at a position or a component on a physical circuit board and a system that immediately reports the type and value of the proper component that is supposed to be located at the pointed position, without the operator having to look at a long list or a dense schematic drawing.

SUMMARY

The present invention provides a system and method for checking and verifying the positions of components on an object such as a circuit board using a probe apparatus.

The invention allows a significant increase in efficiency in the component verification process.

More specifically, a method for checking components of an object includes placing the object in a workspace volume of a probe apparatus. The probe apparatus is operative to provide three-dimensional position information to a computer. One of the components of the object is selected by the user using the probe apparatus, where the selected component is positioned at a particular location on the object. The selected component is compared with reference information about a correct component output using information provided by the computer. The correct component is desired to be positioned at the location of the selected component. By reviewing the displayed reference information, the user or, alternatively, the computer can determine if the selected component is of the correct type, value, or other characteristic. Preferably, the selecting is accomplished by moving a probe tip of the probe apparatus within a predetermined distance of the selected component and activating a control, such as a button.

In a different aspect of the present invention, a method provides verification information about components of an object and includes receiving position information from a probe apparatus. The position information describes a location on the object placed in a workspace volume of the probe apparatus, where a physical component is positioned at the location on the object. Reference data is accessed for a desired component layout of the object, where the reference data includes descriptive information about a component desired to be provided at the location described by the position information. At least a portion of the descriptive information about the desired component is used for a comparison between the descriptive information and the physical component positioned at the location on the object. The method is preferably repeated for each component on the object.

The object is preferably a printed circuit board and the components include circuit board components. The object is preferably located in the 3-D workspace of the probe apparatus by receiving position information from the probe apparatus describing at least two points on the object. An origin of the object is determined and correlated with the reference origin for the reference data. The descriptive information about the desired component includes a type and value of the component. The descriptive information can be output, such as by displaying the information on a display screen and/or outputting audio signals to the user. If the selected component has previously been checked, an indication is output to the user. Preferably, the user initiates a verify signal that is received by the computer when the descriptive information of the desired component matches the physical component on the object at the location. A failure signal is preferably initiated by the user when the descriptive information of the desired component does not match the physical component. The computer preferably stores data associated with the location indicating that the match exists or does not exist. A computer readable medium stores program instructions that perform steps similar to the above method.

The present invention provides an efficient, rapid way to verify that components of an object like a printed circuit board are correctly positioned. A user can quickly point to each component and receive instant, easily-viewed reference information that allows the user to verify that the component is placed correctly. The present invention also allows efficient organization of verification data to allow easy review of components and component placement errors. These and other advantages of the present invention will become apparent upon reading the following detailed descriptions and studying the various figures of the drawings.

DETAILED DESCRIPTION OF THE PREFERRED EMBODIMENTS

The position checking apparatus and method of the present invention allows a relatively low-cost quality control measure for checking and verifying components in objects or assembled products such as circuit boards.

Figure 1:
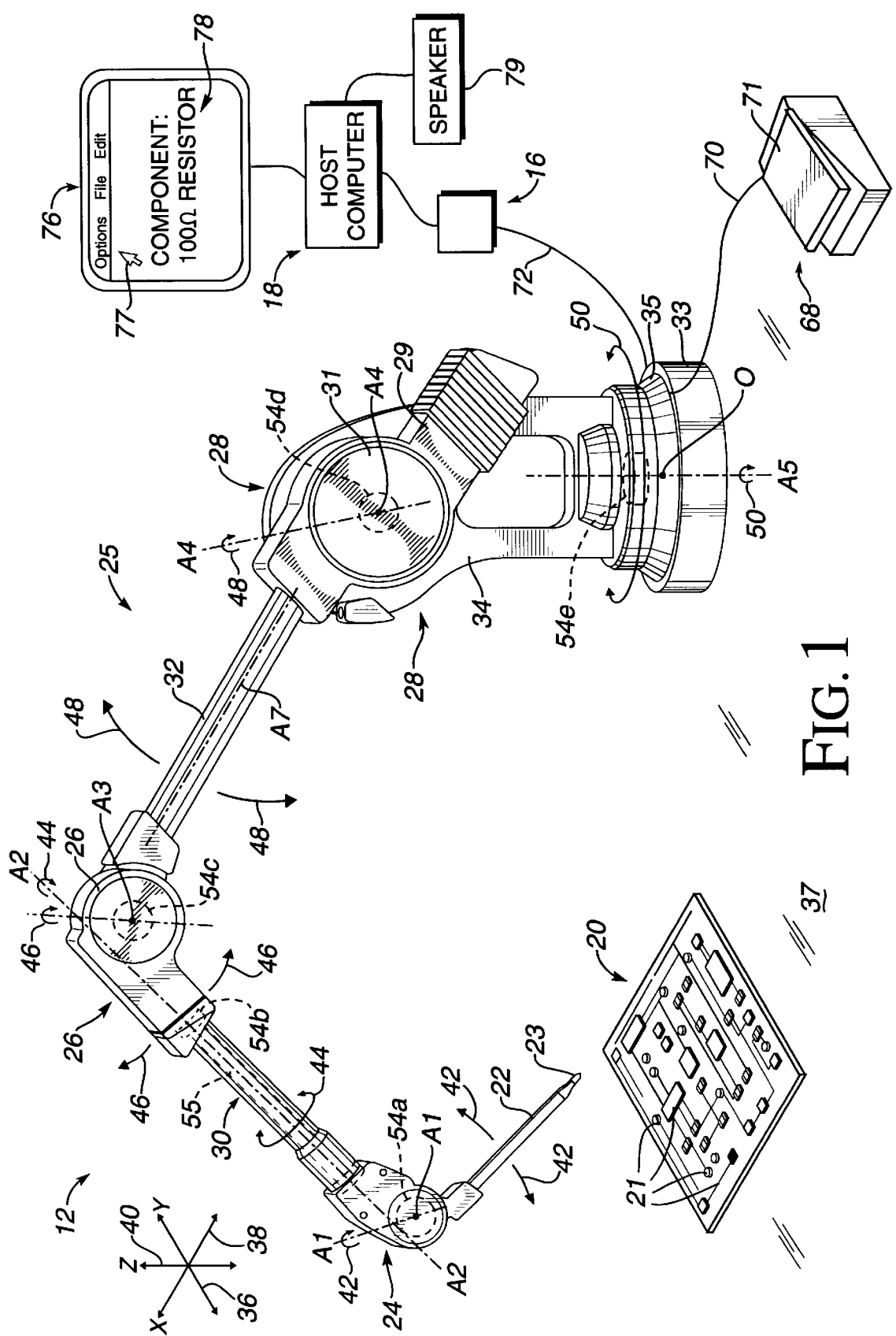
FIG. 1 is a pictorial representation of a system suitable for use with the present invention for checking components.

A position checking system 10 of the present invention is shown in FIG. 1. System 10 includes a probe apparatus 12, an electronic interface 16, a host computer 18, and a test object 20. The illustrated position system 10 is directed to providing a highly accurate verification and confirmation of the position of components on the test object 20.

Probe apparatus 12 is preferably provided to allow a user to select or point to particular components of object 20 for verification purposes and to provide position information to host computer 18. As is well-known to those skilled in the art, a probe that is pointed at different locations in 3-D space, such as over a surface of object 20, can provide coordinate information describing the 3-D geometry of object 20. In the preferred probe apparatus, this coordinate information is provided using sensors operative to measure positions of the probe apparatus at various locations with respect to the fixed base. This is described in greater detail below. A probe apparatus suitable for use in the present invention is the MicroScribe-3D® from Immersion Corporation.

Probe apparatus 12 preferably includes a stylus probe 22 and a mechanical linkage assembly 25. Stylus 22 is a pen-like rod that can be manipulated between a user's fingers to allow a fine degree of control of the probe apparatus. Stylus 22 includes a tip 23 that is used to reference the location of a point pointed to by the probe apparatus. Probes and tips other than stylus 22 can be used in other embodiments. For example, a curved or angled member, hand grip, palm-supported stylus, or other type of probe can be used.

In some embodiments, stylus 22 can have a sensor included on the tip 23 of the stylus 22 or connected to the probe tip. For example, in one embodiment, an electrical probe can be provided at the tip 23 to measure continuity in circuit components and traces of object 20. Alternatively, a voltage sensor or ohmmeter can be connected to the stylus tip 23. In other embodiments, a sensor that can identify the components 21 of the object 20 can be provided at the tip 23 or on the probe apparatus 12. Such embodiments are described in greater detail with respect to FIG. 2.

Stylus 22 is coupled to mechanical linkage assembly 25. Linkage assembly 25 (or "arm") preferably includes joint members 24, 26, and 28, linkages 30, 32 and 34, and base 33. Base 33 also preferably includes a base joint 35 coupled between the base and linkage 34. Stylus 22 is coupled to linkage 30 via joint member 24, and linkage 30 is coupled to linkage 32 via joint member 26. Linkage 32 is coupled to base 33 via joint member 28. The term "joint member", as used herein, refers to a connection mechanism between individual linkage components that may includes at least one "joint" which provides a degree of freedom. Base 33 is preferably securely placed upon or fixed to a support surface 37, such as a tabletop.

Each joint member 24, 26, 28, and 35 provides one or more degrees of freedom to stylus 22 within three-dimensional coordinate space defined by x-axis 36, y-axis 38, and z-axis 40 with respect to fixed base 33. For example, joint member 24 includes two joints which allow stylus 22 to move about axis A1, as shown by arrows 42, and about axis A2, as shown by arrows 44. Joint member 26 includes one joint that allows stylus 22, joint member 24, and linkage 30 to move about axis A3, as shown by arrows 46. Joint member 28 includes two joints that allow stylus 22, joint members 24 and 26, and linkages 30 and 32 to move about axis A4, as shown by arrows 48, and about axis A5, as shown by arrows 50. Joint member 28 actually includes member 31, which rotates about axis A4, and member 34, which is separated from base 33 by joint 35 and rotates to allow linkage assembly 23 to rotate with reference to base 33. Joint 35 allows joint members 24, 26, and 28, linkages 30 and 32, and stylus 22 to move about axis A5. The stylus 22 of the preferred probe apparatus 12 thus can be moved in five degrees of freedom about the axis A1–A5. This preferred configuration of the linkage assembly 25 is described in greater detail in U.S. Pat. No. 5,724,264, which is incorporated herein by reference.

In alternate embodiments, additional degrees of freedom can be added. For example, stylus 22 can be rotated about an axis A6 that is parallel to the lengthwise direction of the stylus to provide a sixth degree of freedom. Conversely, less degrees of freedom can be provided to stylus 22 in some embodiments where more than three or four degrees of freedom are not necessary. In other embodiments, the probe apparatus 12 can be mounted on a linear gantry providing two planar degrees of freedom to increase the workspace of the probe apparatus.

In addition, member 31 of joint member 28 preferably includes a weighted end 29 to counterbalance linkage assembly 23. When end 29 is properly weighted, joint member 26 does not "lock" as easily in a fully extended position (when linkages 30 and 32 are approximately arranged in a straight line) as when end 29 is not weighted, i.e., the weight counterbalances the linkage assembly so that it is easier to move joint 26 from the extended position. Weighted end 29 also allows stylus 22 to be moved more easily in the working volume.

Preferably, sensors 54 (or similar types of transducers) are included in joint members 24, 26, 28, and 35 to measure the change in angle between linkages after power up of probe apparatus 12. Herein, the term "position" refers to the linear coordinate position of tip 23 of stylus 22 along x-axis 36, y-axis 38, and z-axis 40 with respect to an origin O at base 33. For example, each point in space has a unique position having x, y, and z coordinates. The term "orientation", as used herein, refers to the roll, pitch, and yaw of stylus 22 at a particular position with respect to the origin at base 33. For example, the tip 23 of stylus 22 may be at a position (x, y, z) while the stylus 22 has a particular orientation including an angle defined by yaw and pitch coordinates and a spin defined by a roll coordinate. Each of the transducers therefore preferably provides angular position signals or "annular signals" for one of the degrees of freedom of the apparatus. In the preferred embodiment, orientation coordinates are not necessary to check the position of components on object 20; only x, y, and z position coordinates need be used, as explained below.

Sensor 54a is preferably included in joint member 24, two sensors 54b and 54c are included in joint member 26, one sensor 54d is included in joint member 28, and one sensor 54e is included in base 33 (or member 34). Sensor 54b is preferably coupled to joint member 24 via a shaft 55 which is directed through the interior of linkage 30. Thus, when joint member 24 is rotated about axis A2, shaft 55 also rotates, and this rotation is detected by sensor 54b. An additional sensor can be included in joint member 24 to measure movement of stylus 22 about axis A6 in other embodiments. The sensors can be placed in other locations of linkage assembly 23 in other embodiments. Sensors 54 are preferably relative optical encoders for measuring the angle change of rotation of a sensor shaft aligned with a particular axis A1–A5, as is well known to those skilled in the art. A suitable sensor 54, for example, is an optical encoder manufactured by Hewlett Packard. Alternatively, other types of sensors can be used, such as absolute encoders, potentiometers, magnetic sensors, etc., as well as sensors that detect linear motion rather than angular rotation.

A user can point to different positions or locations on the object 20 with stylus 22 to relay position information of the stylus to the host computer to check components at various positions on object 20. Preferably, relative angle information of linkage assembly 25 from sensors 54 is constantly being sent to the host computer and the host computer calculates the current position (e.g. coordinates) of stylus 22 and tip 23 using the angle information. The position and orientation is expressed as a coordinate "point", i.e. a set of x, y, z, roll, pitch, yaw coordinates. In other embodiments, the interface 16 can calculate coordinates from the sensor angle information and send the coordinates to the host computer. In yet other embodiments, angles and/or coordinates are only received by the host computer when a control, such as foot pedal 68, is activated by the user. A user can also "trace" the contours, edges, and surfaces of object 20 with stylus 22 to relay position and orientation information of the stylus to host computer 18, i.e. the user can "digitize" object 20. Herein, "tracing" refers to contacting tip 23 of stylus 22 on a surface of object 20 and moving the stylus along the surface. Sensors 54 of the probe apparatus relay relative angular orientations of linkage assembly 25 and stylus 22 as the stylus is positioned or moved to host computer 18, which converts the angle information into coordinates. Methods of tracing an object with a stylus for such a purpose are well-known to those skilled in the art, and are described in greater detail with reference to U.S. Pat. No. 5,724,264.

Foot pedal 68 is preferably coupled to probe apparatus 12 by a bus 70. Foot pedal 68 includes an activation pedal 71 or similar control, such as a button, switch, etc. The foot pedal 68 is preferably placed below or to the side of support surface 37 to allow a user of probe apparatus 14 to access the pedal easily. When foot pedal 68 is pressed or otherwise activated by a user, the current relative angles using sensors 54 from a reference position are recorded by host computer 18 as a point selected by the user, e.g. the host computer determines (if necessary) and stores the coordinates of the point on a storage medium such as memory or a hard disk. Foot pedal 68 is conveniently placed so that a user can use his or her foot to activate the pedal. The user thus does not have to remove or shift his or her hands from stylus 22 or probe apparatus 12 when sending coordinate information to host computer 18. Also, foot pedal 68 can be coupled to probe apparatus 12 and be separately coupled to host computer 18 or interface 16. In other embodiments, a button or switch can be provided on stylus 22, on a different location of linkage assembly 25, or as a separate hand control, to cause the host computer to record points at the current 3-D location of the stylus 22. In other embodiments, stylus 22 can include a pressure sensor in tip 23 that detects when the tip 23 is contacted with a surface, such as the surface of a component of object 20. The host computer 18 can record the current point if the pressure sensed is above a predetermined threshold pressure.

Electronics interface 16 is coupled to probe apparatus 12 by a bus 72. In the preferred embodiment, interface 16 is included within the outer housing of base 33 (or member 34) of the probe apparatus 12. Alternatively, interface 16 can be provided external both to probe apparatus 12 and host computer 18, or the interface can be provided within host computer 18. In the preferred embodiment, interface 16 serves as an input/output (I/O) device to receive angles from sensors 54 of probe apparatus 12 and transmit those angles to host computer 18, as well as to transmit commands from host computer 18 to probe apparatus 12. Alternatively, interface 16 can transmit coordinate data that was calculated from the raw angle data to host computer 18. The interface 16 can also receive commands from foot pedal 68 or other buttons and/or controls of probe apparatus 12. Interface 16 is described in greater detail with reference to FIG. 1a.

Host computer 18 receives coordinate data from probe apparatus 12 describing object 20. Computer 18 uses the coordinate data to determine the proper component to which the stylus is currently pointing, based on data stored in a storage device accessible to the host computer. Host computer 18 preferably includes standard components such as one or more microprocessors, random access memory (RAM), read-only memory (ROM), input/output electronics, and storage devices such as a hard disk drive, CD ROM drive, etc. Preferably, host computer 18 is a personal computer or workstation. Computer 18 preferably also includes components to allow audio output or is connected to such components, including speakers or a headset.

The host computer 18 is preferably coupled to a display device 76 which can be used to display information to the user regarding a component to which the stylus 22 is currently pointing. For example, the computer preferably accesses a database to determine what component should be positioned at the current position of the stylus, and the computer displays that component and any value and other information of that component on display device 76. Display device 76 can be any conventional CRT, LCD or other flat panel display or screen, etc., and can be connected to host computer 18. Alternatively, the display device 76 can be implemented as a small display on a position of the housing of probe apparatus 12, or as a separate device connected to the probe apparatus 12, to allow easy viewing by the user as different components are selected.

Display device 76 can also display a user interface to an operating system implemented by host computer 18, such as a graphical user interface (GUI). Software can be implemented on host computer 18 such that commands are displayed to the user on display device 76 to offer various options for displaying information about the components of object 20, selecting different objects from a database, entering coordinates, etc., as is well known to those skilled in the art. Descriptive information 78 for a selected component of the object 20 is preferably displayed on display device 76, as described in greater detail below.

A cursor or pointer 77 displayed by the operating system or application program running on computer system 18 is preferably displayed to access functions to manipulate the displayed information or to access features of probe apparatus 12. For example, the user can select different modes or other operations of the probe apparatus using the cursor and a GUI. The pointer can traditionally be manipulated by an input pointing device such as a mouse, trackball, touch pad, or the like. Stylus 22 of probe apparatus 12 can also be used to control the position of pointer 77. For example, as the stylus is moved through 3-D space by the user, the host computer can receive the position data for stylus 22 and convert the data into 2-dimensional coordinates. The host computer 18 would then move pointer 77 to those 2-dimensional coordinates, as is well known to those skilled in the art. Foot pedal 68 can be used similarly to a mouse or other pointing device button. A selection template can also be used to select options of the probe apparatus 12 or the application program of the host computer 18, as described in U.S. Pat. No. 5,724,264. Alternatively, or in addition to, display device 76, the host computer 18 can output audio signals from one or more speakers 79 or a similar device such as headphones.

Test object 20 is an article, product or device preferably having multiple components with designated positions, and which has been previously assembled with those components. The probe apparatus 12 is used to check and verify the positions of the components on the object 20. For example, in a preferred embodiment, object 20 is a printed circuit board used in any of a variety of electronic devices. Components 21 such as resistors, capacitors, inductors, integrated circuit chips, heat sinks, power/ground lines, transistors, diodes, amplifiers, coils, electrical traces and connections, and other electrical and mechanical components are typically assembled on the circuit board using any of a variety of methods, including manual assembly or automated machines such as a "pick and place" machine. The desired positions of these components are determined from a master schematic or similar reference layout that can be stored on a computer database, and to which the host computer 18 has access. Surface mount components or plug-in components can be used. The method of checking components on an object such as a circuit board is described in greater detail with respect to FIG. 2.

Due to the ability of probe apparatus 12 to measure positions in three dimensions, the circuit board or other object 20 can be of any size, shape, thickness, or configuration. Thus, for example, large components such as capacitors which may stick high off the board compared to other components can be verified with no greater difficulty than flatter components. In addition, accuracy is important in the present invention so that proper components are identified, e.g. accuracy of better than 0.01" is preferable since most circuit boards have very small components and traces. The probe apparatus 12 can easily provide this amount of accuracy.

Figure 1A:
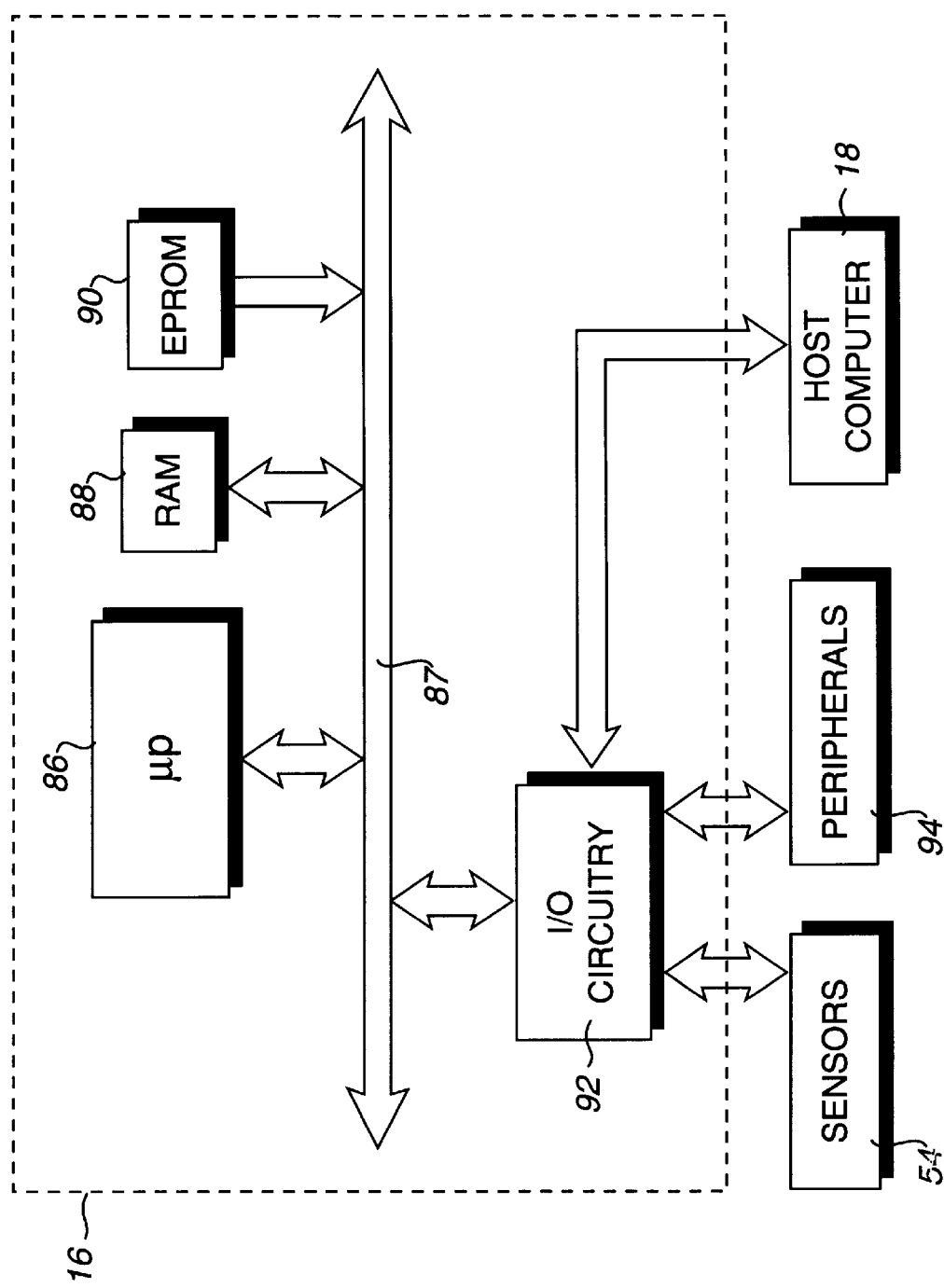
FIG. 1a is a block diagram of interface electronics for use with the system of FIG. 1.

FIG. 1a is a block diagram illustrating a preferred electronics interface 16 for the system 10 shown in FIG. 1. Interface 16 preferably includes a microprocessor 86, random access memory (RAM) 88, read-only memory (ROM) 90, and input/output (I/O) circuitry 92. Microprocessor 86 receives digital signals from the sensors 54 of the probe apparatus and provides angle data to host computer 18, and also may receive commands from host computer 18. Alternately, microprocessor 86 can also compute coordinate data from the angle data. RAM 88 can provide storage for bookkeeping and temporary data. ROM 90 stores instructions for microprocessor 86 to follow and can be an erasable programmable read only memory (EPROM), for example. ROM 90 also preferably stores calibration parameters and other parameters as described subsequently. Microprocessor 86, RAM 88, and ROM 90 can be coupled together by an address/data/control bus 87. Preferably, these components are all integrated in a microcontroller chip, such as Motorola 68HC11, the use of which is well known to those skilled in the art.

I/O circuitry is coupled to bus 87 and can include a variety of circuits and processors for use with probe apparatus 12. Sensors 54, peripherals 94, and host computer 18 are coupled to I/O circuitry 92. I/O circuitry can include preprocessors for converting digital sensor information to angular changes and sending the angle information to microprocessor 86, as well as other sensor interface circuitry. For example, quadrature counters such as the Quadrature Chip LS7166 from Hewlett Packard can be used to continually read the output of an optical encoder sensor and determine an angular change in sensor position. Microprocessor 86 can then provide the joint angles to host computer 18 or convert the angles to the spatial location of the stylus.

Other types of interface circuitry can also be used. For example, an electronic interface is described in U.S. Pat. No. 5,576,727, incorporated herein by reference in its entirety. The electronic interface described therein has six channels corresponding to the six degrees of freedom of the probe device.

Peripherals 94 are also coupled to I/O circuitry 92 and include foot pedal 71 and any other buttons or other input devices that input information to probe apparatus 12. Peripherals 94 can also include any output devices coupled to the probe apparatus, such as sound speakers, displays, lights, etc. Host computer 18 is also coupled to I/O circuitry 92. In one embodiment, a serial port of computer system 18, such as an RS-232 port, connects the I/O circuitry to computer system 18. Alternatively, a parallel port or Universal Serial Bus (USB) port of host computer system 18 can be coupled to I/O circuitry 92, or a plug-in card and slot or other access of computer system 18.

One embodiment uses a USB port to connect multiple probe apparatuses 12 to a single host computer 18. Since the USB is a bus, the computer 18 can communicate with multiple devices connected to that bus. Thus, several operators can be simultaneously checking objects 20, each operator using his or her own probe apparatus to check a different object 20. In addition, each operator can be provided with headphones or other personal audio gear, where each set of headphones is also coupled to the USB. Each operator could then get an audio signal from the host computer (as described below) that is dedicated to his or her own checking process.

Figure 2:
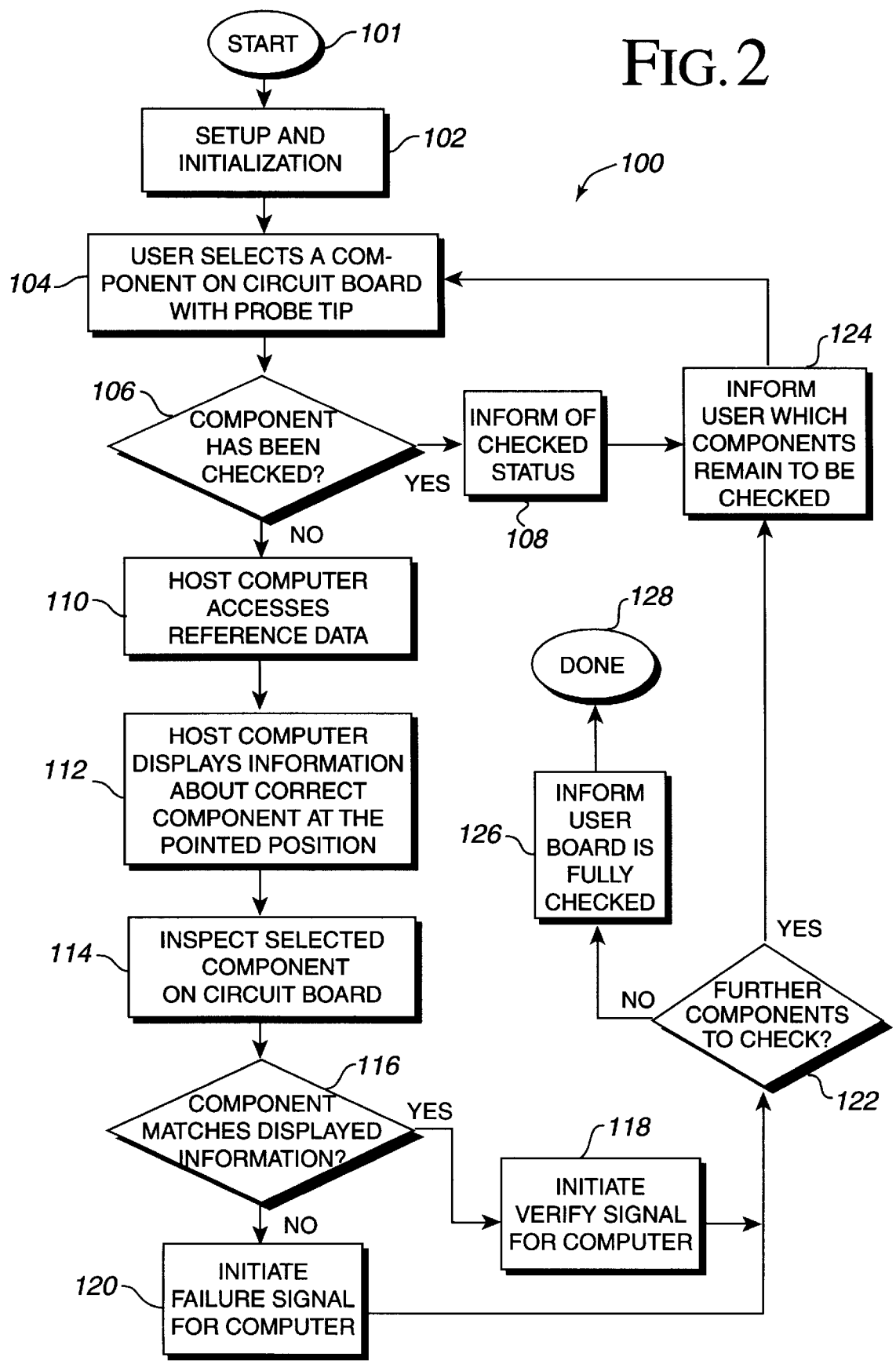
FIG. 2 is a flow diagram illustrating a method of performing and implementing the present invention.

FIG. 2 is a flow diagram illustrating a method 100 of the present invention for checking the positions of components using a probe device such as probe apparatus 12. In the method below, object 20 is referenced as a circuit board and the components are preferably electrical and mechanical components typically found on circuit boards; however, other objects 20 can be used in other embodiments of the invention. Steps of the process 100 which can be implemented by a computer can be performed by a microprocessor or other controller (in host computer 18 or interface 16) based on program instructions (e.g. an application program) stored on and retrieved from a computer readable medium, such as memory devices (RAM, ROM, etc.), magnetic disk, optical disc, magnetic tape, memory cards, or a network medium such as the Internet.

The process beings at 101, and in step 102, a setup and initialization is performed so that the probe apparatus 12 is ready to check the positions of components on the board. The setup step 102 is described in greater detail with respect to FIG. 3. After the setup step, the circuit board 20 is positioned in a stationary position in the workspace volume of the probe apparatus 12. In the method of FIG. 2, it is assumed that the circuit board is maintained at the same position in 3-D space. Alternatively, the circuit board need only be maintained at a constant 2-D planar position if only two dimensions of the circuit board are used.

In step 104, the user selects a component on the circuit board 20 that the user wishes to check using the probe apparatus, e.g. moving stylus tip 23 to the component that is to be selected. This selection can be performed by physically contacting the probe tip with the component, or in some embodiments the tip need only be held above or near the component to select it. If full three dimensional reference data of the components on the board is accessible to the computer 18, then the physical contact of the tip 23 with the component can be approximated by the computer so that such physical contact determines which component has been selected. Or, if only 2-D reference data of the board components is available, then the tip need only be within a predetermined distance above a component to select that component. For example, a 2-D projection of the board can be considered to be positioned above the board within a particular range, such as one inch. When the stylus tip is moved to a position anywhere on the projection in the one inch range above a component, that component is selected. In some embodiments, the user can be required to activate a control to select a component to which the probe points. For example, after the user moves the stylus tip 23 to a component to be selected, the user can be required to push a button on the stylus, push the foot pedal 68, or activate some other control before the position of the stylus tip is considered by the host computer to be a selected point.

As described above, in the preferred embodiment, relative angle data from sensors 54 is continually being provided to the host computer 18. The host computer calculates coordinates from the relative angle data to determine a point in the working volume of the probe apparatus. Thus the computer 18 determines when the stylus tip 23 has a position that selects a component. In other embodiments, the interface 16 can determine coordinates from the relative angle data from sensors 54 and provide the coordinates to the host computer. The "position information" received by the host computer thus can be raw angle sensor data from sensors 54, coordinates, or any information processed from the raw angle sensor data that will allow the host computer to determine coordinates.

In step 106, the host computer determines whether the component selected by the user has already been checked. If not, the process continues to step 110, described below. If so, then the process continues to step 108, in which the host computer informs the user of the component's "checked" status. This can be accomplished, for example, by displaying an appropriate message or picture on the display device 76. Alternatively, indicators on the probe apparatus 12 can be used. For example, a green light emitting diode (LED) can be illuminated when the component has previously been checked (and the same or different LED can be illuminated red when the component has not yet been checked). Furthermore, audio output can be used to indicate the checked status. For example, a particular beep or output speech can indicate that the selected component has not yet been checked. Such methods as the LED on the probe apparatus and the audio output allow the user to quickly determine which components on the circuit board still need to be checked by moving the stylus 22 to each component. After step 108, the process preferably continues to step 124, described below (or alternatively returns to step 104 for a different component).

In step 110, after it has been determined that the selected component has not yet been checked, the host computer accesses reference data from a storage device which indicates the "correct components" (or "desired components") that should be positioned at the various locations on the circuit board according to the desired circuit board layout. The computer accesses the reference data based on the component selected by the user in step 104. Thus, for example, if the user selects a capacitor positioned at x and y coordinates of 120 and 80, respectively, with the probe tip (based on an origin designated in the 3-D workspace of the probe apparatus 12), then the host computer accesses the equivalent coordinates of the reference data and checks for any component positioned at that location. For example, the host computer can translate the coordinates to the frame of the reference circuit board layout and check which component is located at the coordinates in the reference board layout.

In step 112, the host computer outputs information about the correct component at the position of the selected component, as accessed in step 110. This information can be output in many different forms in different embodiments. In one embodiment, the name of the correct component is visually displayed as text. Further information can also be displayed in text form, such as a part number, coordinates, etc. In addition, even further details can be retrieved from the database by host computer 18 and displayed, such as detailed specifications for the component, pin-outs, and usage ratings. The host computer and/or reference database can also be linked to an inventory database so that stock information for the component (current number in stock, etc.) can be displayed. Optionally, the user can select one or more controls such as a button or GUI icon to display such detailed additional information.

Furthermore, a pictorial representation of the correct component can be displayed in addition to or instead of the textual information. For example, a rotating 3-D image of the correct component can be displayed to provide the user with visual information and ease the checking process. Alternatively or in addition to the visual text/pictorial display, audio information can be output, such as a voice describing the correct component, or a particular audio sound or alert indicating the type and/or name of the component. An audio feature would allow the user to check components on the circuit board without having to lift his or her eyes from the board. Also, the pictorial and/or audio information can be output from the probe apparatus 12, such as on a small screen or from audio speakers positioned on the probe apparatus or on a separate device positioned near the probe apparatus 12.

In step 114, the component selected in step 104 on the circuit board is inspected. In a preferred embodiment, the user who is selecting the components visually inspects the selected component and identifies the component based on a label or other markings on the selected component. In an alternate embodiment, the component is inspected by the host computer 18 (or interface 16) when the user moves a sensor on the probe apparatus within an appropriate sensing range of the selected component. For example, each component 21 on the board 20 can include a bar code or similar marking. A bar code reader can be incorporated into the stylus 22, such as at stylus tip 23, and the host computer 18 (or interface 16) is electrically connected to the bar code reader. When the user selects a component in step 104 by moving the stylus tip close to or in contact with the component, the bar code reader is able to read the bar code. Alternatively, the user can pass the bar code reader over the bar code to read the bar code. Reading information through the use of optical devices and bar codes in well known to those skilled in the art. The bar code information read by the host computer using the bar code reader identifies the component by type, value, and/or any other desired information. In other embodiments, a different type of identifying information, such as a mark or signature, can be placed on each component. For example, a particular type of color or material might be used for each different value and type of component on the board, and a sensor included in tip 23 can distinguish each type of color or material, allowing the host computer 18 to identify the type and/or value of the component. There is added utility in placing such identifying information on each component, since the same identifying information can be used to keep track of components in inventory systems.

In step 116, the selected component is compared with the correct component information accessed by the host computer 18 in step 110. The process checks whether the selected component matches the correct component information from the database. In a preferred embodiment, the user makes the comparison based on viewing the label or other information on the selected component and viewing or hearing the correct component information output by the host computer in step 112. In a different embodiment, the host computer can make the comparison if bar code or other information was read from the selected component by a sensor on the probe apparatus when the sensor was brought within the appropriate sensing range of the selected component by the user.

If the selected component matches the correct component, then in step 118, a verify signal is initiated to the host computer that indicates the selected component correctly matches the correct component information. In the preferred embodiment where the user performs the comparison, the user initiates this verify signal. For example, the user can send the verify signal by selecting a button on the probe apparatus, by selecting a key on a separate control, keypad or keyboard, by providing a voice confirmation to a speech recognizer running on host computer 18 (or another connected computer), or by other suitable input devices. In the alternate embodiment in which the computer 18 performs the comparison of step 16, then the computer provides its own verify signal or indication, such as setting a flag in memory. In any case, the host computer 18 preferably stores information on a computer readable medium (e.g., in the main database and/or a record for the object 20) indicating that a verify signal has been initiated for the particular selected component. Thus, by later analyzing this stored information, the host computer or a user can determine which components on the circuit board have already been checked. The process then continues to step 122, described below.

If the selected component is found not to match the correct component information in step 116, then the process continues to step 120, in which a failure signal to the host computer is initiated. Similar to the verify signal of step 118, the failure signal can be provided by the user using a control or input device; for example, a button or key can be pressed by the user or a voice command can be input to the host computer to initiate the failure signal. The failure signal or indication can also be provided by the host computer 18 if the computer performed the comparison of step 116. The host computer stores information (e.g. in the main database and/or in a record for the object 20) indicating that a failure signal has been initiated for the particular selected component. After the circuit board components are completely checked, the user or host computer can analyze the stored failure information to determine which components are in error and must be replaced with the correct components. Alternatively, circuit boards with any failed components can be immediately placed in a particular storage area to be later checked more thoroughly, or discarded.

After step 118 or step 120, the process continues to step 122, in which the process checks whether any further components have not yet been checked on the circuit board and which still should be checked. The host computer can determine this by simply checking the correct components in the reference data to determine whether each component has either stored verify information or failure information associated with it. Those components that are not associated with either verify or failure information have not yet been checked. If such further unchecked components exist, the process continues to step 124, in which the host computer informs the user that at least one component needs to be checked. The computer can inform the user in different ways for different embodiments. For example, a graphical drawing of the circuit board 20 can be displayed on a display screen, with components that have not been checked indicated in a particular color (e.g. red) and components that have been checked indicated in a different color (e.g. green). The user might be able to zoom the view to a particular area of the displayed board to show greater detail or otherwise manipulate the displayed image. For example, once a zoom magnification is selected, the displayed view on the display device 76 can be centered on and track the corresponding position of the circuit board 20 over which the stylus tip is located and moved. In addition, the computer can continuously inform the user on a component-by-component basis which components have been checked and which have not been checked during the selection step, as described above with respect to step 108. After step 124, the process returns to step 104, where the user selects a different component on the circuit board.

If it is determined in step 122 that no further components need be checked, then in step 126 an appropriate message or indication is displayed by the host computer to inform the user of this condition. A summary display of the circuit board can also be displayed, showing which of the components are correct and showing which are in error. The process is then complete at 128. The user can then remove the circuit board to an appropriate location and place a new unchecked circuit board in the workspace volume of the probe apparatus 12, such that a new process begins at 101.

In some embodiments, other characteristics of the circuit board can also or alternatively be checked. For example, the stylus tip 23 may include a conductivity or continuity sensor. In one embodiment, a separate lead or clip is connected to the continuity sensor by a cord or wire. The user can then check the continuity of traces (e.g. etched connections) or other components of the circuit board by checking the electrical connection between the separate lead and the probe tip sensor. For example, the user can contact the separate lead to a power terminal or a ground terminal and the computer 18 can then display or indicate a point on board 20 connected to a trace for which the continuity is to be checked. The user then places the stylus tip to select the indicated trace point and the continuity is checked by the host computer, e.g. by sourcing power through the probe tip and separate lead to determine whether there is substantially no resistance and thus a connection between the probe tip and the separate lead on the trace. Such continuity testing is well known to those skilled in the art. This embodiment requires that the host computer 18 (or interface 16) be electrically connected to the tip sensor to monitor trace connections as they are selected by the user. In a different embodiment, two probe apparatuses 12 are connected to host computer 18 and are used to check trace continuity, where the stylus tip 23 of one probe apparatus is contacted to one end of the trace, and the tip 23 of the other probe apparatus is contacted to the other end of the trace. Any trace or portion of a trace on the board 20 can be readily checked since the trace or portion of the trace can be identified by the host computer from the position of the two probe apparatus tips. The host computer can display or otherwise output the continuity results and can also store the results in a storage medium such as a database.

Furthermore, in other embodiments other characteristics can be sensed, such as voltage or resistance of components on board 20. To measure resistance between two points, power can be provided between the stylus tip 23 and the separate lead (or between two stylus tips 23) so that resistance between the leads is determined, similar to an ohmmeter. To measure voltage or current, the circuit on board 20 can be powered by a different source, as is well known to those skilled in the art.

Figure 3:
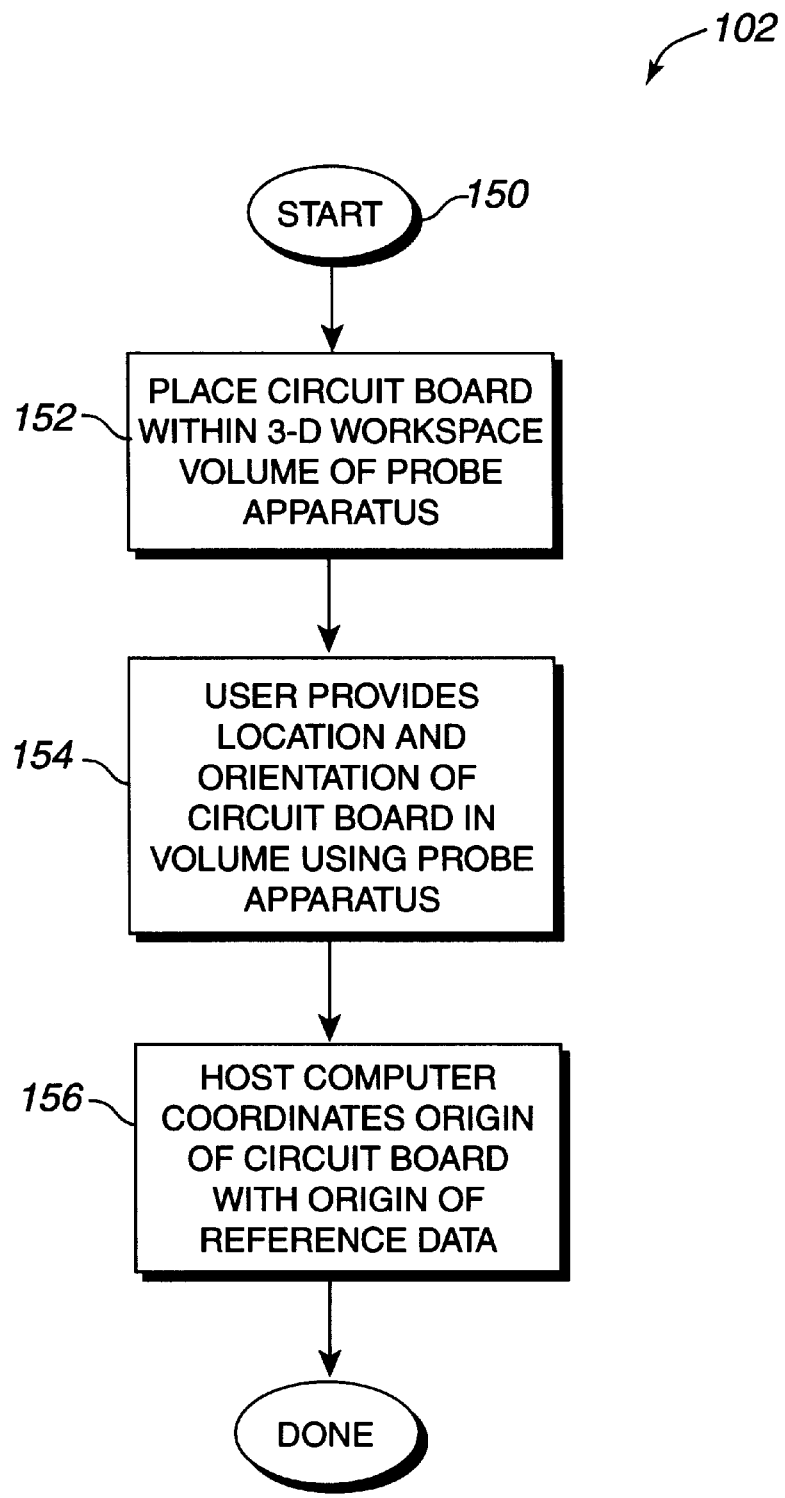
FIG. 3 is a flow diagram illustrating the setup step of the method of FIG. 2.

FIG. 3 is a flow diagram illustrating the setup step 102 of FIG. 2. The process begins at 150. In a first step 152, a circuit board is placed within the 3-D workspace of the probe apparatus 12. This can be accomplished by manual or automated methods. In a next step 154, the user provides location and orientation information of the circuit board in the 3-D volume to the host computer using the probe apparatus. The preferred way of accomplishing this is for the user to touch a number of known points of the circuit board with the stylus tip 23 while the circuit board is in a stationary testing position with respect to the workspace volume. Since the coordinates of these points can be determined from the probe apparatus 12 with respect to a reference position in the workspace volume, the position of the circuit board is also known. Determining the location of an object in 3-D space from such coordinates is well known to those skilled in the art. If the circuit board is known to be sitting on a flat surface, only two different points on the circuit board need be provided. If the circuit board can take an arbitrary position and orientation within the workspace volume, then three different points on the circuit board can be provided to locate the board. The points taken can be any convenient contact points of the circuit board; for example, corners, mounting holes, or other easy-to-find points can be contacted with the stylus tip 23.

In next step 156, the host computer coordinates or aligns the origin of the circuit board with the origin of reference data which describes the desired circuit board layout. The reference data describes all the correct components of the circuit board with respect to a reference origin and is preferably stored in a database or similar organization of data that is easily accessed by the host computer. As described above, the database information may include the center position, size, and shape of each component on the circuit. This database can store reference data for many different circuit boards, each having different size, shape, layout, types of components, etc.

The host computer coordinates this reference origin with an origin of the circuit board, where the physical circuit board origin is determined based on the reference points entered in step 154. Once the origins of the two frames are coordinated, the computer knows the expected location of each component of the circuit board within the three dimensional workspace volume of the probe apparatus. The process then continues to the component checking portion of the process as described with reference to FIG. 2.

While this invention has been described in terms of several preferred embodiments, there are alterations, modifications, and permutations thereof which fall within the scope of this invention. It should also be noted that the embodiments described above can be combined in various ways in a particular implementation. Furthermore, certain terminology has been used for the purposes of descriptive clarity, and not to limit the present invention. It is therefore intended that the following appended claims include all such alterations, modifications, and permutations as fall within the true spirit and scope of the present invention.

What is claimed is:

1. A method for providing verification information about physical components of an object, the method comprising:

receiving position information from a probe apparatus manually positioned by a user, said position information describing a particular location on an object placed in a workspace volume of said probe apparatus, wherein a particular one of said physical components is positioned at said particular location on said object, and wherein said object includes a plurality of said physical components, each positioned at a different location on said object;

accessing reference data for a desired component layout of said object, said reference data including descriptive information about a desired component desired to be provided at said particular location described by said position information received from said probe apparatus, said descriptive information including a description of a type of said desired component to be positioned at said particular location; and providing said descriptive information about said desired component to allow a comparison between said type of said desired component and a type of said particular physical component positioned at said particular location on said object.

2. A method as recited in claim 1 wherein said object is a printed circuit board and said physical components include circuit board components.

3. A method as recited in claim 2 further comprising receiving a signal from said probe apparatus indicating whether an electrical connection exists between two leads on a probe tip of said probe apparatus, wherein said probe tip is contacted by said user to an electrical trace on said printed circuit board.

4. A method as recited in claim 2 wherein said descriptive information about said desired component includes a value associated with said desired component, and wherein said comparison is also between said value associated with said desired component and a value associated with said physical component.

5. A method as recited in claim 2 further comprising receiving position information from said probe apparatus indicating a location of said printed circuit board in three-dimensional space.

6. A method as recited in claim 5 wherein said position information indicating a location of said printed circuit board in three-dimensional space includes at least two points.

7. A method as recited in claim 5 further comprising determining an origin of said printed circuit board and correlating said origin with a reference origin for said reference data.

8. A method as recited in claim 2 further comprising repeating said receiving position information, accessing reference data, and providing said descriptive information for a different location on said printed circuit board.

9. A method as recited in claim 1 wherein said position information includes raw angle data from sensors of said probe apparatus, and further comprising determining coordinates from said raw angle data, said coordinates indicating said particular location on said object.

10. A method as recited in claim 1 wherein said providing said descriptive information includes outputting said descriptive information to said user.

11. A method as recited in claim 10 wherein said outputting said descriptive information includes displaying said descriptive information on a display screen.

12. A method as recited in claim 10 wherein said outputting said descriptive information includes outputting audio signals to said user.

13. A method as recited in claim 1 further comprising determining if said particular location has previously been received as position information, and outputting an indication to said user that said particular physical component has already been checked if said particular location has previously been received.

14. A method as recited in claim 1 wherein said comparison between said type of said desired component and said type of said particular physical component is performed by said user after receiving said provided descriptive information.

15. A method as recited in claim 14 further comprising receiving a failure signal initiated by said user when said type of said desired component does not match said type of said particular physical component.

16. A method as recited in claim 15 further comprising storing data associated with said particular location indicating that a match exists or does not exist between said types of said desired component and said particular physical component.

17. A method as recited in claim 1 wherein said receiving position information, accessing reference data and providing said descriptive information are performed by a host computer coupled to said probe apparatus, and wherein said comparison between said type of said desired component and said type of said particular physical component is performed by said host computer.

18. A method as recited in claim 17 wherein said comparison is performed by reading identifying information from said particular physical component using a sensor included on said probe apparatus said identifying information indicating said type of said physical component.

19. A method as recited in claim 18 wherein said sensor includes a bar code reader operative to read a bar code positioned on said particular physical component.

20. A method as recited in claim 17 further comprising storing verify or failure information for said particular physical component indicating that a match exists or does not exist between said types of said desired component and said particular physical component.

21. A method as recited in claim 1 further comprising receiving a verify signal initiated by said user when said type of said desired component matches said type of said particular physical component.

22. A method for checking components of an object, the method comprising:

placing said object in a workspace volume of a probe apparatus, said probe apparatus operative to provide three-dimensional position information to a computer coupled to said probe apparatus;

selecting one of said components of said object using said probe apparatus, said selected component being positioned at a particular location on said object; and comparing at least one characteristic of said selected component with reference information about a correct component displayed from information provided by said computer, said correct component being desired to be positioned at said particular location of said selected component, wherein said reference information includes a description of a desired type of said correct component to be positioned at said particular location of said selected component.

23. A method as recited in claim 22 wherein said object is a printed circuit board and said components include circuit board components.

24. A method as recited in claim 23 wherein said probe apparatus is moved and operated manually by a user, wherein said selecting one of said components of said object using said probe apparatus includes selecting a trace between two leads of said probe apparatus, and wherein said comparing at least one characteristic of said selected component with reference information includes verifying an electrical connection exists between said two leads.

25. A method as recited in claim 22 further comprising providing an object location to said computer using said probe apparatus, said object location being in three-dimensional space.

26. A method as recited in claim 25 wherein said object location is provided as at least two points in three-dimensional space to said computer.

27. A method as recited in claim 22 wherein said selecting one of said components is accomplished by a user moving a probe tip of said probe apparatus within a predetermined distance of said selected component, wherein said predetermined distance can be greater than zero to allow selection when said probe tip is not contacting said selected component.

28. A method as recited in claim 22 wherein said selecting is accomplished by a user moving a probe tip of said probe apparatus within a predetermined distance of said selected component and by said user activating a control on said probe apparatus while said probe tip is within said predetermined distance of said selected component.

29. A method as recited in claim 28 further comprising initiating a failure signal to said computer if said at least one characteristic of said selected component does not match said reference information about said correct component.

30. A method as recited in claim 29 further comprising initiating a verify signal to said computer if said at least one characteristic of said selected component matches said reference information about said correct component.

31. A method as recited in claim 22 wherein said probe apparatus includes an arm linkage having a plurality of joints.

32. A method for providing verification information about components of an object, the method comprising:

receiving position information from a probe apparatus manually positioned by a user, said position information describing a particular location on an object placed in a workspace volume of said probe apparatus, wherein a physical component is positioned at said particular location on said object;

accessing reference data for a desired component layout of said object, said reference data including descriptive information about a desired component desired to be provided at said particular location described by said position information received from said probe apparatus, wherein said descriptive information describes at least one characteristic of said desired component, said at least one characteristic including a type of said desired component; and outputting said descriptive information about said desired component to allow a user to compare said at least one characteristic of said desired component with a corresponding at least one characteristic of said physical component positioned at said particular location on said object.

33. A method as recited in claim 32 wherein said object is a printed circuit board and said components include circuit board components.

34. A method as recited in claim 33 wherein said descriptive information about said desired component includes a value associated with said desired component.

35. A method as recited in claim 32 wherein said outputting said descriptive information includes displaying said descriptive information on a display screen.

36. A method as recited in claim 32 further comprising receiving a verify signal initiated by said user when said at least one characteristic of said desired component matches said corresponding at least one characteristic of said physical component.

37. A method as recited in claim 36 further comprising receiving a failure signal initiated by said user when said at least one characteristic of said desired component does not match said corresponding at least one characteristic of said physical component.

* * * * *